US00RE36248E

United States Patent [19]

Farago et al.

[11] E Patent Number: Re. 36,248

[45] Reissued Date of Patent: Jul. 13, 1999

[54] METHOD OF MAKING A CARBON COMMUTATOR

[76] Inventors: Charles P. Farago, 6804 Woodhaven Ave., Cleveland, Ohio 44144; Bruce Ramsey, Sr., 23633 Foster Rd., Litchfield, Ohio 44253

[21] Appl. No.: 08/548,236

[22] Filed: Oct. 25, 1995

Related U.S. Patent Documents

Reissue of:

[64] Patent No.: 5,255,426
Issued: Oct. 26, 1993
Appl. No.: 07/965,175
Filed: Oct. 23, 1992

U.S. Applications:

[62] Division of application No. 07/808,942, Dec. 13, 1991, Pat. No. 5,175,463, which is a continuation of application No. 07/390,202, Aug. 7, 1989, abandoned.

[51] Int. Cl.[6] ..... H01R 43/06

[52] U.S. Cl. ..... 29/597; 310/237

[58] Field of Search ..... 29/597, 598; 310/233, 310/236, 237

[56] References Cited

U.S. PATENT DOCUMENTS

| | | | |
|---|---|---|---|
| 1,811,180 | 6/1931 | Landers | 310/237 |
| 2,645,733 | 7/1953 | Marsal | 29/597 X |
| 3,538,365 | 11/1970 | Reisnecker | 310/237 |
| 4,283,841 | 8/1981 | Kamiyama | 29/597 |
| 4,349,384 | 9/1982 | Weinert | 29/597 X |
| 4,358,319 | 11/1982 | Yoshida et al. | 29/597 X |
| 4,396,358 | 8/1983 | de Concini | 29/597 X |
| 4,399,383 | 8/1983 | Kamiyama | 29/597 X |
| 4,851,728 | 7/1989 | Duege et al. | 310/233 |
| 5,157,299 | 10/1992 | Gerlach | 310/237 |

*Primary Examiner*—Carl E. Hall
*Attorney, Agent, or Firm*—Calfee, Halter & Griswold LLP

[57] ABSTRACT

A method of making a carbon commutator is provided. The method includes the steps of providing a planar substrate having a series of current-carrying regions; providing a carbon base having a brush-contacting surface and a second opposite surface; substantially covering the second surface of the carbon base with a conductive plating to form an unslotted commutator body; applying a conductive bonding layer to the conductive plating; bonding the unslotted commutator body to the substrate; and cutting corresponding slots in the commutator body to form a series of commutator segments.

17 Claims, 1 Drawing Sheet

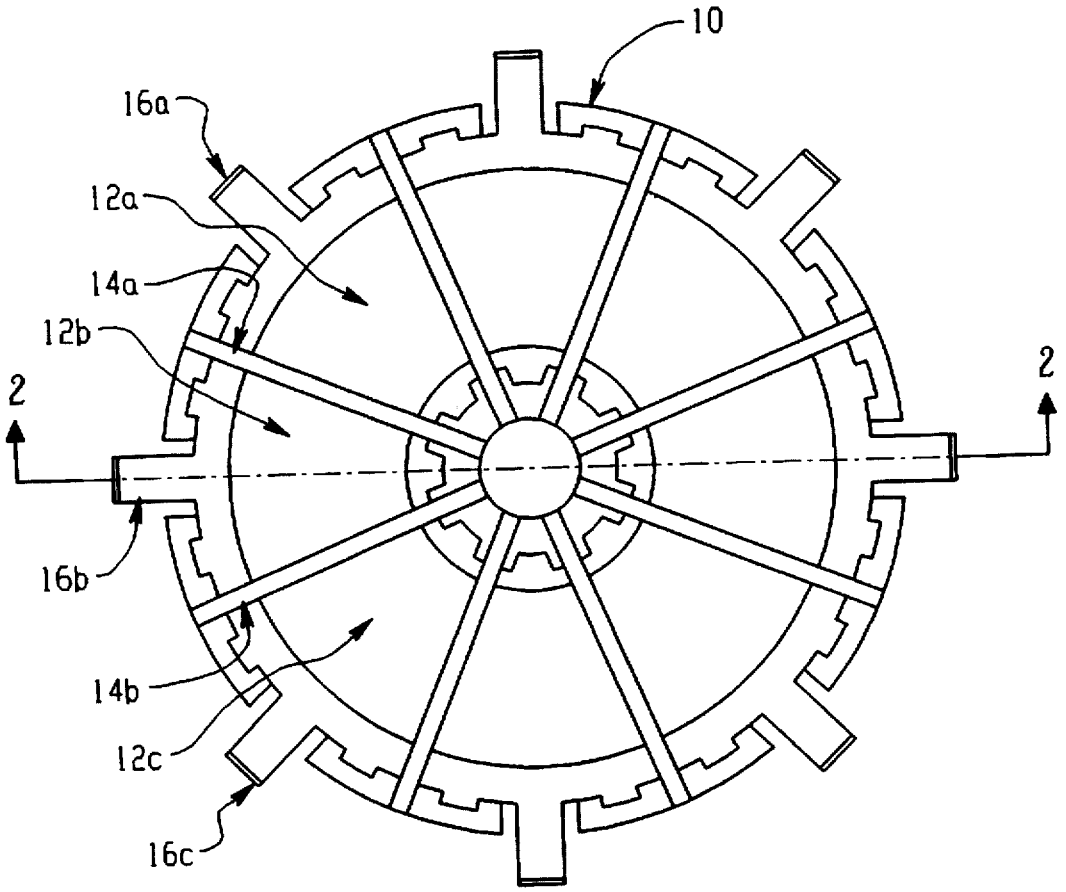
Fig. 1 (AMENDED)
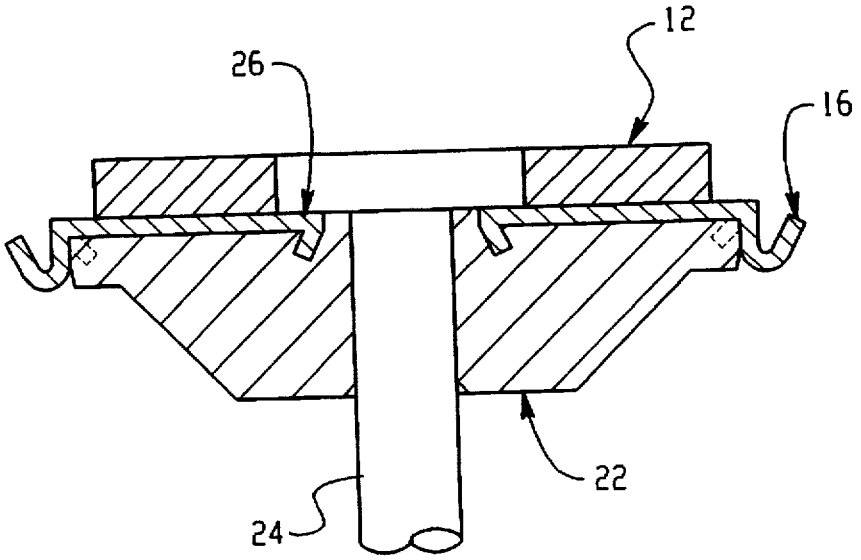
Fig. 2 (AMENDED)

METHOD OF MAKING A CARBON COMMUTATOR

Matter enclosed in heavy brackets [ ] appears in the original patent but forms no part of this reissue specification; matter printed in italics indicates the additions made by reissue.

This application is a divisional of U.S. application Ser. No. 07/808,942, filed on Dec. 13, 1991 (now U.S. Pat. No. 5,175,463), which was a continuation of U.S. application Ser. No. 390,202, filed Aug. 7, 1989, now abandoned.

BACKGROUND OF THE INVENTION

1. Field of the Invention

The present invention is in the field of making commutators for electrical motors. More particularly, this invention is in the field of carbon commutators for electric fuel pumps operating in an environment of single- or multiple-component hydrocarbon fuels with a significant portion of oxygen-containing moieties.

2. Description of the Prior Art

Electric fuel pumps have long been used in automotive applications to effect movement of liquid fuels from the storage means to the engine. Early pumps were simply the application of electrical energy to a mechanical pump; later pumps incorporated the motor and pump mechanism, but maintained the isolation of the fuel from the motor.

While mechanical pumps generally are located near the engine, and serve primarily as suction devices, electric fuel pumps function best as pressure pumps, and are most often located very near the fuel tank. Present technology often provides a fuel pump submerged inside the fuel tank, with the electric motor operating in the liquid fuel itself, thus eliminating the need for shaft seals or any other mode of isolation of the motor from the environment.

Electric fuel pumps operating in a substantially pure hydrocarbon environment, i.e., gasoline or diesel fuel, are known in the art, and have acceptable operating lives. In U.S. Pat. No. 4,399,383, Kamiyama discloses a gasoline-resistant commutator having a silver current-carrying medium plated or clad onto a copper substrate to minimize wear on the commutator surface by the motor brushes working submerged in a gasoline tank. The Kamiyama patent, however, is restricted by its terms to operation in an ordinary gasoline environment, and its efficacy in other media is unpredictable.

In more recent times, the advent of mixed fuels with a significant portion of oxygen-containing moieties, e.g., methanol or ethanol, added to the base hydrocarbon, has lead to problems with the rapid wear of the commutators of conventional submerged electric fuel pumps. It has been determined that the Kamiyama device is only moderately suitable in such other types of environments containing significant amounts of hydroxylic components. While not wishing to be bound by theoretical consideration set forth herein it is believed that copper and other metals, under the influence of highly localized electrical fields such as those encountered with interface sparking or current transfer, react with the hydroxyl group of an alcoholic fuel moiety or water dissolved therein, thus producing the respective metal salt which is then carried into the fuel stream. Continuously repeated reactions of this sort drive the equilibrium of the equation of that reaction to the right, causing a comparatively rapid removal of the metal until the commutator surface is worn beyond utility, leading to unacceptably short service life of the fuel pump.

While submerged fuel pumps have been used with acceptable service lives in environments consisting essentially of gasoline with only minor amounts of additives such as octane enhancers, anti-gum agents and the like, the increasing occurrence of oxygen-containing fuels, specifically alcohols, has lead to high rates of wear on copper commutators. With a continuing emphasis on matters of concern for the environment, there is a substantial likelihood that fuels consisting primarily of gasoline may be replaced entirely or in part by oxygen-containing liquid fuels such as, e.g., methanol and ethanol. Under these circumstances, submerged fuel pumps with metallic, e.g., copper commutators will be unsatisfactory.

SUMMARY OF THE INVENTION

The present invention is the fuel pump and the method for making such a fuel pump for operation in an environment of a hydrocarbon fuel having a significant portion of oxygen-containing moieties, the pump consisting of a body, a shaft, a commutator, and brushes in contact with the commutator, where the method of making the commutator comprises the steps of affixing a formed carbon article to a substrate, machining the article to a commutator, and cutting slots into the commutator. In one embodiment, the method includes forming the carbon article directly on the substrate prior to the machining steps.

BRIEF DESCRIPTION OF THE DRAWINGS

FIG. 1 is a plan view of the article formed by the method of the invention, showing a flat commutator.

FIG. 2 is a sectional view taken along lines 2—2 of FIG. 1.

DESCRIPTION OF THE PREFERRED EMBODIMENTS

A preferred embodiment of the present invention is the method of making a fuel pump for operation in an environment of a hydrocarbon fuel having a significant portion of oxygen-containing moieties, wherein the pump consists of a body, a shaft, a commutator, and brushes in contact with the commutator, where the commutator is formed of carbon, the method comprising affixing a carbon article to a substrate, machining the article to a commutator, and cutting slots into the commutator. The most-preferred embodiment is the method of making the commutator which comprises affixing a formed carbon article to a substrate, machining the article to a commutator, cutting slots into the commutator, and thereafter electrically connecting the commutator to the armature of the finished fuel-pump motor.

As used herein, the term "significant," as applied to the oxygen moiety of a hydrocarbon fuel, comprehends fuels with about ten percent or greater oxygen-containing constituents such as methanol, ethanol, propyl alcohols, ketones and the like.

Turning now to FIG. 1, the article formed by the method of the preferred embodiment of the invention is shown generally at 10. Commutator 12 comprises a plurality of segments 12a, 12b and 12c, separated by radial slots 14a, 14b, etc. Tangs 16a, 16b, etc., provide a current path for the current-carrying windings of the finished motor.

In FIG. 2, which is a sectional view taken along lines 2—2 in FIG. 1, commutator 12 is shown affixed to commutator substrate 22 in electrical contact with tangs 16. Substrate plate portions 26 are integral with tangs 16. Shaft 24 provides transmission of force to the fuel pump (not shown).

In one embodiment of the method of the present invention, fine-grain electrical-grade carbon is molded into a toroidal shape with [coplanar] *two planar* surfaces, and a layer or film of a first conductive material such as, e.g., nickel is plated onto one of the planar surfaces thereof. A second conductive layer or film is plated onto the first conductive material, and an electrically conductive material having a relatively low melting point is deposited onto the second layer. The treated surface of the torus is then placed in juxtaposition with the planar surface of the substrate plate portions 26 of commutator substrate 22, and the items heated to cause the low-melting-point material to form an electrically conductive bond therebetween. Substrate plate portions 26 are substantially thinner than the teaching of the prior art, being from about 0.15 to 0.75 millimeter (mm), and preferably from about 0.30 to about 0.60 mm in thickness. The thickness of similar devices of the prior art is in the range of about 1.5 to 2.0 mm.

The first conductive material is preferably nickel, but can be copper or other appropriately conductive material such as, e.g., gold, silver, copper or conductive alloy. The second conductive film can be the same as or different from the first, and is preferably copper, but can also be gold, silver, cadmium, chromium, or other conductive material or alloy. The low-melting conductive material is preferably a multi-component solder alloy containing primarily tin and antimony, bismuth or other relatively low-melting metal, and melting at a temperature low enough to avoid thermal damage to the device during the steps of its formation, but high enough to avoid loss of mechanical strength during such steps or the operation of the finished fuel-pump motor. Other alloys can also be used, including, e.g., brass, german silver, and gold, silver and copper alloys, to bond the commutator metallically to the substrate.

The commutator is then slotted through to isolate electrically each portion 12a, 12b, etc., from the other portions. Following the step of slotting the commutator, appropriate wire windings are applied to tangs 16, and the motor is completed in accordance with techniques known to those skilled in the art.

In another embodiment of the method of this invention, electrical-grade carbon is pressed directly onto the armature, and the rough shape is machined as required to provide contact surfaces and current paths. In this embodiment, the substrate portion can be of any configuration required, commensurate with proper operation of the finished motor. Thus, the commutator or substrate, or both, can be, without limitation herein, planar, cylindrical, toroidal or conical.

In yet another embodiment of the present invention, a preformed rough commutator is treated appropriately to provide at least one planar surface parallel with the surface provided for electrical contact, and the planar surface then adhesively fastened to the substrate to provide an electromechanical bond. In this embodiment, the adhesive used must have conductivity adequate to transmit the electrical current required for proper motor performance. The adhesive may conveniently have metal particles carried therein.

The completed motor made in accordance with the foregoing method is assembled into a fuel pump and operated while immersed in a hydrocarbon fuel containing a significant portion of oxygen-containing moieties, and demonstrates a clear improvement in performance as compared with submerged fuel pumps of the prior art.

Modifications, changes and improvements to the preferred forms of the invention herein described, disclosed and illustrated may occur to those skilled in the art who come to understand the principles and precepts thereof. Accordingly, the scope of the patent to be issued hereon should not be limited to the particular embodiments of the invention set forth herein, but rather should be limited only by the advance by which the invention has promoted the art.

What is claimed is:

1. A method of making [the] *a* commutator comprising the steps of:

providing a planar substrate having a series of current-carrying regions;

providing a carbon base having a brush-contacting surface and a second opposite surface;

substantially covering the second surface of the carbon base with a conductive plating to form an unslotted commutator body;

applying a conductive bonding layer to said conductive plating;

bonding the unslotted commutator body to the substrate; and cutting corresponding slots in the commutator body to form a series of commutator segments.

2. The method of claim 1 wherein said step of providing a carbon base comprises molding fine-grain electrical grade carbon into a shape having at least two opposite surfaces.

3. The method of claim 1 wherein said first substantially covering step comprises plating the second surface of the carbon base with a first conductive material selected from a group consisting of nickel, copper, gold, silver, or alloys thereof to form a first conductive layer.

4. The method of claim 3 wherein said substantially covering step further comprises plating the first conductive layer with a material selected from a group consisting of copper, gold, silver, cadmium, chromium, or alloys thereof.

5. The method of claim 1 wherein said substantially covering step comprises the steps of plating the second surface of the carbon base with a first conductive material to form a first conductive layer and plating the first conductive layer with a second conductive material which is the same as the first conductive material.

6. The method of claim 1 wherein said first substantially covering step comprises the steps of plating the second surface of the carbon base with a first conductive material to form a first conductive layer and plating the first conductive layer with a second conductive material which is different than the first conductive material.

7. The method of claim 1 wherein said applying and said bonding steps comprise the steps of depositing an electrically conductive adhesive on the second conductive layer and adhesively fastening the unslotted commutator body to the substrate.

8. The method of claim 1 wherein said applying and bonding steps comprise the steps of depositing a low-melting conductive bonding material on the second conductive layer, placing the second conductive layer adjacent the substrate, and placing the unslotted commutator and the substrate in a heat-bonding environment.

*9. A method of making a commutator having a plurality of commutator sections with substantially coplanar brush contacting surfaces, comprising:*

*providing a substrate having a substantially planar and conductive surface and a series of current carrying regions;*

*providing a carbon base having a substantially planar brush-contacting surface and a second substantially planar surface that is opposite from said first surface;*

*bonding said second surface to the conductive surface of said substrate; and*

*cutting slots in said carbon base to subdivide said base into a series of carbon base segments so that each carbon base segment defines a brush-contacting surface formed from said first surface, and each carbon base segment together with an associated current carrying region defines one of said commutator sections.*

*10. The method of claim 9, wherein said carbon base is toroidal in shape.*

*11. The method of claim 9, wherein said carbon base is formed from electrical grade carbon.*

*12. The method of claim 9, wherein said second surface is adhesively bonded to the conductive surface or said substrate to provide an electromechanical bond.*

*13. A method of making a commutator comprising the steps of:*

*providing a preformed substrate having at least one substantially planar face with a conductive plate affixed thereto and conductive tangs extending from said conductive plate;*

*providing a preformed carbon base having a brush-contacting surface and a second opposite surface;*

*bonding said second opposite surface to said conductive plate;*

*bonding said carbon base to said substrate; and*

*cutting slots in said carbon base to subdivide said base into a series of carbon base segments so that each of said carbon base segment is isolated electrically from the other carbon base segments.*

*14. The method of claim 13 wherein each of said carbon base segments is electrically connected through said conductive plate to one of said tangs.*

*15. The method of claim 13 wherein said conductive plate has a thickness of about 0.15 mm to about 0.75 mm.*

*16. The method of claim 13 wherein wherein said conductive plate has a thickness of about 0.30 mm to about 0.60 mm.*

*17. The method of claim 13 wherein the step of providing a pre-formed carbon base comprises molding fine-grain electrical grade carbon.*

* * * * *